(12) United States Patent
Bhartia et al.

(10) Patent No.: US 11,579,889 B2
(45) Date of Patent: Feb. 14, 2023

(54) PROGRAMMABLE INSTRUCTION BUFFERING FOR ACCUMULATING A BURST OF INSTRUCTIONS

(71) Applicant: ARM Limited, Cambridge (GB)

(72) Inventors: Jatin Bhartia, Cambridge (GB); Kauser Yakub Johar, Cambridge (GB); Antony John Penton, Little Canfield (GB)

(73) Assignee: ARM LIMITED, Cambridge (GB)

( * ) Notice: Subject to any disclaimer, the term of this patent is extended or adjusted under 35 U.S.C. 154(b) by 20 days.

(21) Appl. No.: 16/950,936

(22) Filed: Nov. 18, 2020

(65) Prior Publication Data

US 2021/0089323 A1 Mar. 25, 2021

Related U.S. Application Data

(63) Continuation of application No. 15/974,769, filed on May 9, 2018, now Pat. No. 10,866,810.

(30) Foreign Application Priority Data

Jun. 7, 2017 (GB) ..................... 1709064

(51) Int. Cl.
*G06F 9/38* (2018.01)
*G06F 9/30* (2018.01)

(52) U.S. Cl.
CPC ........ *G06F 9/3867* (2013.01); *G06F 9/30079* (2013.01); *G06F 9/30087* (2013.01); *G06F 9/3814* (2013.01)

(58) Field of Classification Search
CPC .. G06F 9/3867; G06F 9/3814; G06F 9/30087; G06F 9/30079; G06F 9/3869;

(Continued)

(56) References Cited

U.S. PATENT DOCUMENTS 5,579,498 A 11/1996 Ooi
5,765,037 A 6/1998 Morrison
(Continued)

FOREIGN PATENT DOCUMENTS

EP 0 987 624 3/2000
JP H6-131178 5/1994
(Continued)

OTHER PUBLICATIONS

Combined Search and Examination Report for GB 1709064.8, dated Nov. 8, 2017, 6 pages.
(Continued)

*Primary Examiner* — Shawn Doman
(74) *Attorney, Agent, or Firm* — Nixon & Vanderhye, P.C.

(57) ABSTRACT

A processing system 2 includes a processing pipeline 12, 14, 16, 18, 28 which includes fetch circuitry 12 for fetching instructions to be executed from a memory 6, 8. Buffer control circuitry 34 is responsive to a programmable trigger, such as explicit hint instructions delimiting an instruction burst, or predetermined configuration data specifying parameters of a burst together with a synchronising instruction, to trigger the buffer control circuitry to stall a stallable portion of the processing pipeline (e.g. issue circuitry 16), to accumulate within one or more buffers 30, 32 fetched instructions starting from a predetermined starting instruction, and, when those instructions have been accumulated, to restart the stallable portion of the pipeline.

18 Claims, 5 Drawing Sheets

(58) Field of Classification Search
CPC .... G06F 9/3871; G06F 9/3836; G06F 9/3826; G06F 9/38; G06F 9/3834
USPC ..................................... 712/205, 219, 227
See application file for complete search history.

(56) References Cited

U.S. PATENT DOCUMENTS

| | | | |
|---|---|---|---|
| 6,006,032 | A | 12/1999 | Blandy |
| 6,212,603 | B1 | 4/2001 | McInerney et al. |
| 6,230,263 | B1 | 5/2001 | Ryan |
| 6,353,805 | B1 | 3/2002 | Zahir et al. |
| 6,370,638 | B1 | 4/2002 | Yamasaki |
| 6,629,167 | B1 | 9/2003 | Undy |
| 6,671,795 | B1 | 12/2003 | Marr |
| 6,691,240 | B1 | 2/2004 | Stotzer |
| 6,859,871 | B1 | 2/2005 | Batten |
| 6,988,187 | B2 | 1/2006 | Magoshi |
| 7,139,898 | B1 | 11/2006 | Nemirovsky |
| 7,469,334 | B1 | 12/2008 | Chaudhry |
| 7,490,221 | B2 | 2/2009 | Evans |
| 9,251,117 | B2 | 2/2016 | Hanai |
| 9,417,916 | B1 | 8/2016 | Stark |
| 2003/0084273 | A1 | 5/2003 | Moore |
| 2003/0149860 | A1 | 8/2003 | Becker |
| 2004/0039896 | A1 | 2/2004 | Pechanek |
| 2004/0059904 | A1 | 3/2004 | Sonnekalb |
| 2004/0068640 | A1 | 4/2004 | Jacobson et al. |
| 2004/0098577 | A1 | 5/2004 | Sane |
| 2005/0154860 | A1 | 7/2005 | Arimilli |
| 2006/0010309 | A1 | 1/2006 | Chaudhry |
| 2007/0074012 | A1 | 3/2007 | Graham |
| 2007/0083742 | A1 | 4/2007 | Abernathy |
| 2007/0226465 | A1 | 9/2007 | Chaudhry |
| 2008/0126770 | A1 | 5/2008 | Morrow |
| 2009/0198980 | A1 | 8/2009 | Alexander et al. |
| 2009/0210679 | A1 | 8/2009 | Tsai et al. |
| 2011/0264862 | A1 | 10/2011 | Karlsson |
| 2012/0023314 | A1 | 1/2012 | Crum |
| 2012/0233441 | A1 | 9/2012 | Barreh |
| 2014/0032828 | A1 | 1/2014 | Khailany |
| 2014/0075156 | A1 | 3/2014 | Blasco-Allue |
| 2014/0181482 | A1 | 6/2014 | Smaus |
| 2015/0301830 | A1 | 10/2015 | Wiencke |
| 2015/0378732 | A1 | 12/2015 | Gschwind |
| 2016/0378496 | A1 | 12/2016 | Gray |
| 2017/0083337 | A1 | 3/2017 | Burger |
| 2017/0109251 | A1 | 4/2017 | Das |
| 2017/0139716 | A1 | 5/2017 | Caulfield et al. |
| 2018/0095753 | A1 | 4/2018 | Bai |
| 2018/0136955 | A1 | 5/2018 | Takeo |
| 2018/0357065 | A1 | 12/2018 | Bhartia et al. |

FOREIGN PATENT DOCUMENTS

| | | |
|---|---|---|
| JP | H11-15661 | 1/1999 |
| JP | 2002-149404 | 5/2002 |
| JP | 2009-110209 | 5/2009 |
| JP | 2011-508309 | 3/2011 |
| WO | 2006/083542 | 8/2006 |
| WO | 2006/112190 | 10/2006 |

OTHER PUBLICATIONS

Extended European Search Report dated Oct. 30, 2018 in EP Application No. 18170259.8, 6 pages.
Office Action issued in JP 2018-101271, dated May 31, 2022 with English translation (9 pages).
Ryan, Bob, "M1 of Cyrix to challenge to Pentium", Nikkei Byte, Mar. 1, 1994, Nikkei Business Publications, Inc., No. 123, pp. 295-301, with English Translation (11 pages).
Office Action issued in KR 10-2018-0062243, dated Nov. 20, 2022, with English translation (12 pages).

PROGRAMMABLE INSTRUCTION BUFFERING FOR ACCUMULATING A BURST OF INSTRUCTIONS

CROSS REFERENCE TO RELATED APPLICATIONS

This application is a Continuation Application of Application Ser. No. 15/974,769, filed May 9, 2018 and claims priority to GB Patent Application No. 1709064.8 filed Jun. 7, 2017, the entire content of each of which are hereby incorporated by reference.

BACKGROUND

Technical Field

This disclosure relates to the field of data processing systems. More particularly, this disclosure relates to data processing systems including a processing pipeline and the control of the flow of instructions through that processing pipeline.

Technical Background

It is known to provide data processing systems including processing pipelines comprising multiple stages, such as stages corresponding to instruction fetch, instruction decode, instruction issue, instruction execution, and write back. Such pipelined processing contributes to increased instruction throughput through parallelism. The instruction fetch stage of the processing pipeline serves to fetch instructions to be executed from a memory system storing those instructions. The time taken to fetch an instruction can vary considerably, such as in dependence upon factors such as whether the instruction is cached, whether the instruction must be fetched from a slower main memory, whether fetching the instruction triggers a virtual to physical page mapping fault, etc. Thus, the time taken to fetch an instruction may vary by many orders of magnitude.

This variation introduces differences in the times it may take to execute a given sequence of instructions as in one case all of the instructions may be cached and available with no delay, whereas in another instance of the same instructions the instruction fetch stage may be required to perform multiple high latency fetch operations involving main memory and potentially page table walking. Fetches can be from different sources, or different types of main memories with varying delays, such as Flash, DDR memory, etc.

SUMMARY

At least some embodiments of the disclosure provide apparatus for processing data comprising:
a processing pipeline having fetch circuitry to fetch instructions to be executed from a memory;
a one or more buffers to store instructions fetched from said memory by said fetch circuitry;
buffer control circuitry responsive to a programmable trigger:
to stall a stallable portion of said processing pipeline downstream of said one or more buffers;
to accumulate within said one or more buffers a burst of instructions comprising a number of instructions starting from a predetermined starting instruction; and
when said number of instruction have been accumulated within said one or more buffers, to restart said stallable portion of said processing pipeline.

At least some embodiments of the disclosure provide apparatus for processing data comprising:
a processing pipeline having fetch means for fetching instructions to be executed from a memory;
a one or more buffer means for storing instructions fetched from said memory by said fetch means;
buffer control means responsive to a programmable trigger:
for stalling a stallable portion of said processing pipeline downstream of said one or more buffer means;
accumulating within said one or more buffer means a burst of instructions comprising a number of instructions starting from a predetermined starting instruction; and
when said number of instruction have been accumulated within said one or more buffer means, for restarting said stallable portion of said processing pipeline.

At least some embodiments of the disclosure provides a method of processing data comprising:
fetching instructions to be executed from a memory; and
in response to a programmable trigger:
stalling a stallable portion of a processing pipeline downstream of one or more buffers;
accumulating within said one or more buffers a burst of instructions comprising a number of instructions starting from a predetermined starting instruction; and
when said number of instruction have been accumulated within said one or more buffers, for restarting said stallable portion of said processing pipeline.

Further aspects, features and advantages of the present technique will be apparent from the following description of examples, which is to be read in conjunction with the accompanying drawings.

DESCRIPTION OF EXAMPLES

Figure 1:
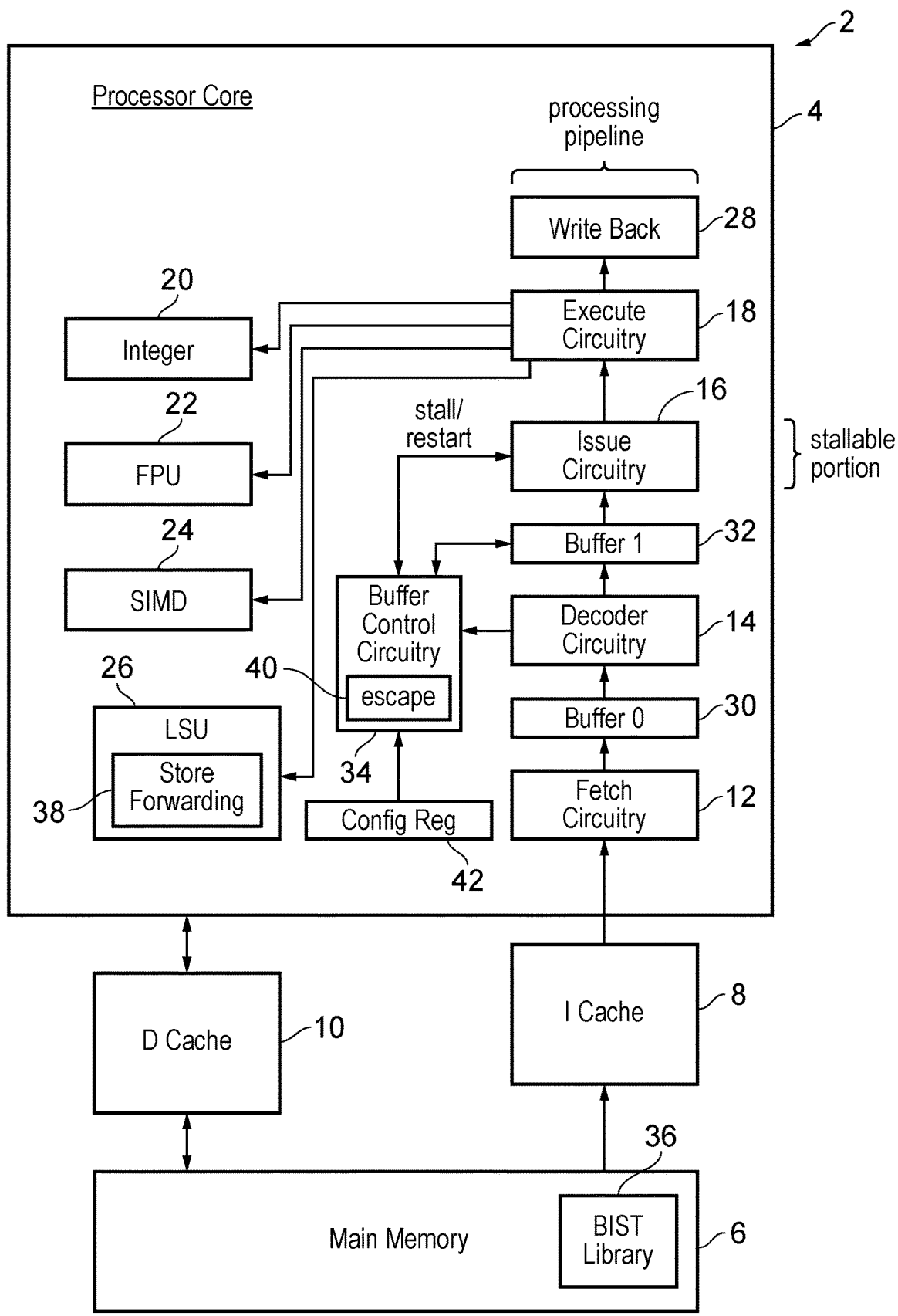
FIG. 1 schematically illustrates a data processing system including a processor core having a processing pipeline.

FIG. 1 schematically illustrates a data processing system 2 comprising a processor core 4 coupled to a memory system comprising a main memory 6, an instruction cache 8 and a data cache 10. The processor core 4 includes a processing pipeline comprising multiple pipeline stages including fetch circuitry 12 for fetching program instructions from the instruction cache 8 or the main memory 6, decoder circuitry 14 for decoding program instructions to generate control signals for controlling processing operations specified by those program instructions, issue circuitry 16 for controlling when decoded instructions are issued to be executed, execute circuitry 18 which co-ordinates execution of the instructions using different functional units, such as an integer pipeline 20, a floating point pipeline 22, a single instruction multiple data (SIMD) pipeline 24 and a load store unit 26, and finally write back circuitry 28 which serves to write back results of executed instructions into the system and the memory.

In operation, instructions are fetched by the fetch circuitry 12 from the instruction cache 8. If a miss occurs in the instruction cache 8, then the instruction is fetched from the main memory 6. Such a main memory instruction fetch will take more time than a fetch from the instruction cache 8. The fetch circuitry 12 stores fetched instructions into a first buffer 30. Decoder circuitry 14 reads instructions from the first buffer 30 and decodes them to form decoded instructions which are then stored within a second buffer 32. Issue circuitry 16 reads the decoded instructions from the second buffer 32 and issues these to the execute circuitry 18, 20, 22, 24, 26 when slots are available to execute those instructions within the relevant functional unit. Finally, write back circuitry 28 serves to write back the results of executing the instructions to update the state of the processor core with those results.

Buffer control circuitry 34 coupled to the decoder circuitry 14 receives a signal from the decoder circuitry 14 when this decodes a program instruction serving as a programmable trigger to stall a stallable portion of the processing pipeline, accumulate within one or more buffers a burst of instructions, and then, when a number (which may be predetermined) of program instructions have been accumulated within the one or more buffers, to restart the stallable portion of the processing pipeline.

In this example embodiment, the stallable portion of the processing pipeline comprises the issue circuitry 16. When this is stalled in response to the programmable trigger, instructions (and decoded instructions) are accumulated within buffers 30 and 32. It will be appreciated that in other embodiments different portions of the processing pipeline may serve as the stallable portion. For example, the decoder circuitry 14 could be stalled such that the instructions accumulate within the first buffer 30. In other embodiments it could be that the execute circuitry 18, or individual functional processing blocks such as the integer pipeline 20, the floating point pipeline 22, the single instruction multiple data pipeline 24 or the load store unit 26, could be stalled with the effect that instructions are buffered upstream of such stalled portions at least in respect of instructions intended to be executed by those stalled portions (e.g. it would be possible to stall and accumulate instructions intended to be executed by the integer pipeline 20 while instructions to be executed by other pipelines 22, 24, 26 within the execution circuitry were allowed to continue).

The stalling of the processing pipeline in order to accumulate bursts of fetched instructions can have a variety of uses including uses which seek to test the operation of the data processing system. For example, built in self test library code 36 stored within the main memory 6 may be executed to test the correct functioning of portions of the data processing system. In order to ensure that the test is properly performed and is not influenced by the timing of the fetching of program instructions, the built in self test library code 36 may include instructions which serve as a programmable trigger for the stalling, accumulation and restarting operations as described above such that particular sequences/bursts of instructions within built in self test code may be executed with a deterministic timing which is independent of any instruction fetch delay variation. Another example use of the present technique is executing a particular sequence/burst of instructions with a deterministic timing (independent of any instruction fetch delay) to sample multiple data points from different peripherals/devices in close timing proximity.

As an example, the load store unit 26 may include stall forwarding circuitry 38 which serves to buffer given write data of a pending data write to a given memory address before that given write data is written out to the memory (such as the data cache 10 or the main memory 6) and, while such a write is pending and the given write data is stored within the store forwarding circuitry, serves to service a subsequent data read for that given address using the copy of the data stored within the store forwarding circuitry 38 rather than and incurring the delay of waiting for that write data to be written out to the memory system and then reading that data back from the memory system. However, in order to properly test such store forwarding circuitry, it is important that the write operation is rapidly followed by the read operation such that the store out to memory will not have taken place and the store forwarding circuitry will be active in servicing the read. This may be achieved by including the write instruction and the subsequent read instruction within a burst of instructions which is gathered together within the processing pipeline downstream of the fetch circuitry 12 and then released as a burst of instructions to be processed such that the write instruction will be followed by the read instruction with a deterministic timing between the write instruction and the read instruction which is independent of variable fetch delays.

The buffer control circuitry 34 includes escape circuitry 40 which serves to detect an escape event and when such an escape event is detected stops any accumulating of instructions into the one or more buffers 30, 32 and restarts the stallable portion (e.g. the issue circuitry 16 in this example embodiment). Such escape circuitry 40 may, for example, be useful to ensure that pathological conditions such as, for example, deadlocks do not arise whereby fetched instructions never arrive due to other processes preventing those instructions being fetched and so the processing pipeline is permanently stalled. Another example use of the escape circuitry 40 is where there is no predetermined length for the burst of instructions accumulated while the pipeline is stalled, rather instructions are accumulated until, for example: a hardware trigger event arises (such as a buffer full signal—buffer sizes may different between implementations); or a certain programmed monitor event arises within the design (or buffer control circuitry); or an interrupt or abort is triggered; or combinations of the preceding. The escape circuitry can thus provide either or both of a backdoor to stop a stall or a main design feature to stop a stall in an intended manner.

The escape events which are detected by the escape circuitry 40 may take a variety of different forms. For example, the escape event may comprise that a time taken for the number of instructions to be fetched from the memory exceeds a threshold time, e.g. a time out timer. Alternatively, the escape event may serve to detect one or more monitor events having occurred (e.g. a predetermined number of attempted memory fetches, a predetermined number of memory aborts, etc) which are indicative of a problem such that the processing pipeline should be restarted/unstalled.

The one or more buffers, 30, 32 into which the number of instructions is accumulated subsequent to the programmable trigger may be buffers which are already provided within the processing pipeline for the normal operation of that processing pipeline. In this case, the additional overhead associated with providing the facility to stall, accumulate and restart a stallable portion of the processing pipeline for instruction fetch determinism may be relatively low. In other example embodiments it is possible that dedicated buffers may be provided to serve to store the accumulated instructions before the stalled portion of the pipeline is restarted.

When the stalled portion is restarted, the burst of instructions which have been accumulated within the one or more buffers may be executed atomically e.g. without intervening interrupts or other delays. Such atomic execution is assisted by the accumulation of the instructions within the one or more buffers as this removes the possibility of memory aborts arising partway through executing the atomic sequence due to memory faults within instruction fetches.

The programmable trigger for controlling the buffer control circuitry 34 to control the processing pipeline to perform the stall, accumulate and restart steps may take a variety of different forms as will be described further below. Some of the forms of control and the provision of the programmable trigger may utilise a configuration register 42 into which parameters relating to the programmable trigger may be stored. For example, a programmable flag may be set within the configuration register 42 to prime the buffer control circuitry 34 to perform the actions of the stalling, accumulating and restarting in synchronism with a synchronising instruction which has yet to be received. The configuration register 42 may also in some embodiments store a parameter specifying the length of the burst of instructions to be accumulated.

Figures 2, 3:
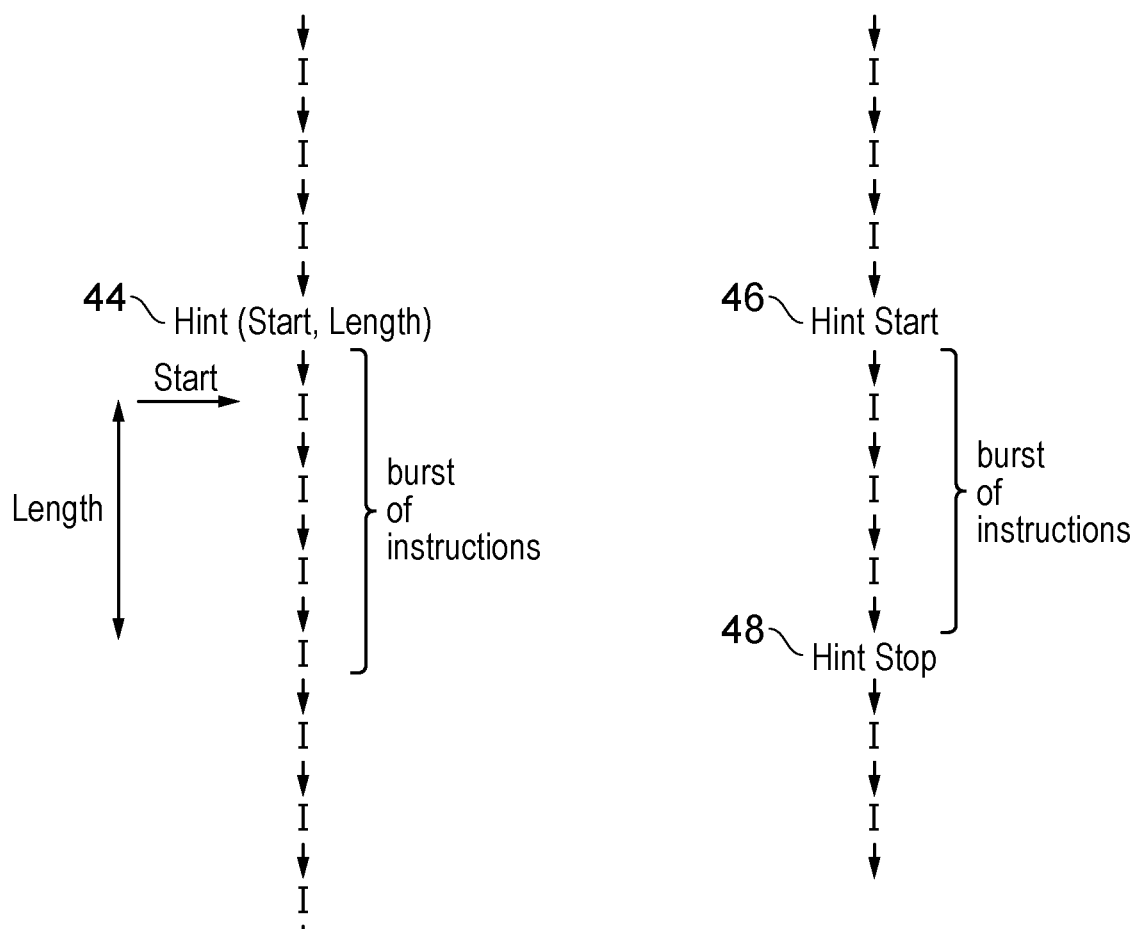
FIGS. 2, 3 and 4 schematically illustrate different example forms of programmable triggers.

FIG. 2 schematically illustrates a first form of programmable trigger. In this example the sequence of the program instructions includes a hint instruction 44 which specifies a programmable Start point parameter and a programmable burst Length parameter. When such a hint instruction is decoded by the decoder circuitry 14, then this controls the buffer control circuitry 34 to then perform control of the processing pipeline to stall, accumulate and restart in accordance with the start point parameter and burst length parameter which are decoded.

FIG. 3 schematically illustrates a different form of programmable trigger. In this example the sequence of program instructions includes a hint instruction 46 marking a start of a burst of instructions and a hint instruction 48 marking an end of that burst of instructions. Thus, the burst of instructions is delimited by respective start and stop instructions 46, 48 embedded within the program instruction stream.

Figure 4:
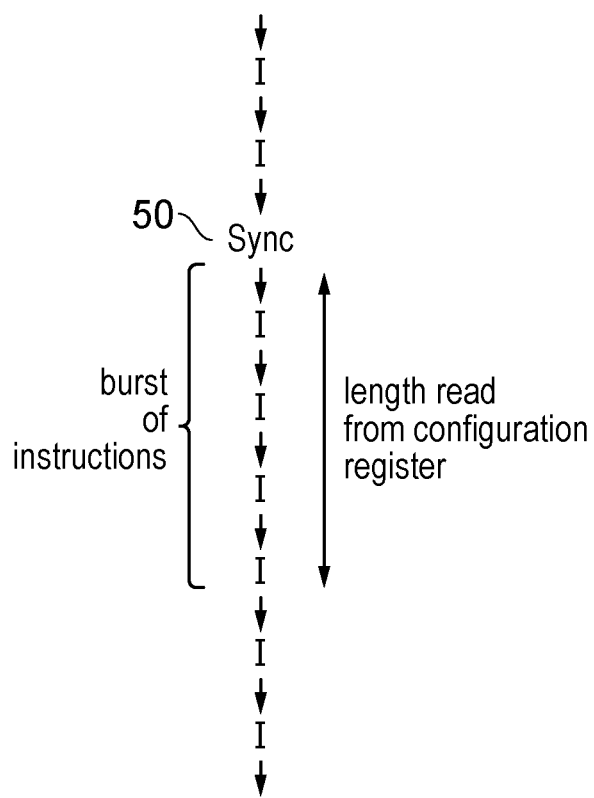

FIG. 4 schematically illustrates a further example of a programmable trigger which may be used. In this example the program executed sets a programmable flag within the configuration register 42 to prime the buffer control circuitry 34 to perform the actions of stalling, accumulating and restarting with appropriate parameters such as a parameter specifying the burst length to be accumulated. Once primed, the buffer control circuitry 34 may be triggered to initiate such burst accumulation with a synchronising instruction 50 within the sequence of program instructions which are executed.

It will be appreciated that the examples discussed above are only some forms of the circuitry and programmable triggers which may be used in embodying the present techniques. Other forms of circuitry and programmable trigger are also possible.

Figure 5:
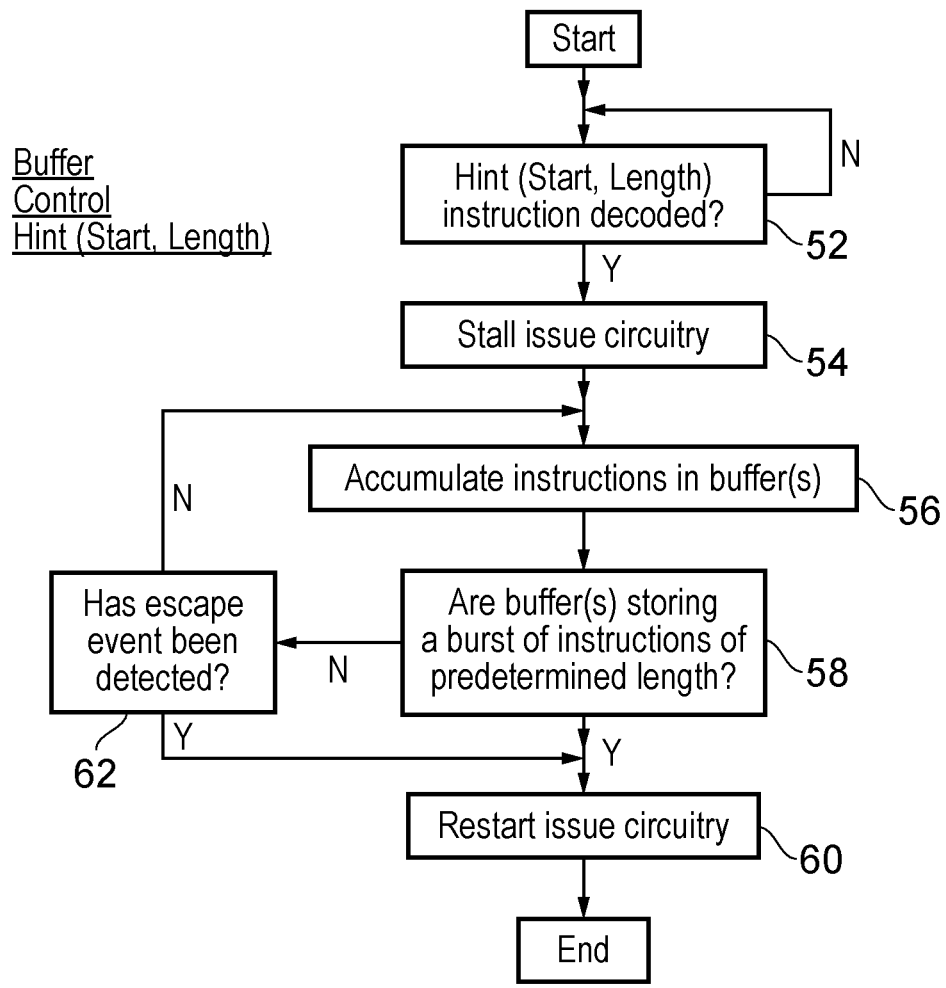
FIG. 5 is a flow diagram schematically illustrating buffer control using a hint instruction that specifies a start point and a burst length.

FIG. 5 is a flow diagram schematically illustrating buffer control using a hint instruction which specifies a programmable start point parameter and a programmable burst length parameter. Processing waits at step 52 until such a hint instruction is received. Step 54 stalls the issue circuitry 16 (other stallable portions of the processing pipeline may be employed in different example embodiments). Step 56 accumulates instructions into the buffers 30, 32 as they continue to be fetched by the fetch circuitry 12. Step 58 determines whether the buffers 30, 32 are now storing a burst of instructions of the predetermined length specified by the burst length parameter within the hint instruction decoded at step 52. If the determination at step 58 is that the burst of instructions has been fully accumulated, then processing proceeds to step 60 at which the issue circuitry 16 is restarted (unstalled). If the determination at step 58 is that the burst of instructions has not yet been fully accumulated, then processing proceeds to step 62 at which a determination is made as to whether or not the escape circuitry 40 has detected an escape event (e.g. a time out). If such an escape event has not been detected then processing returns to step 56. If such an escape event has been detected, then the operation proceeds to step 60 where the issue circuitry 16 is restarted.

Figure 6:
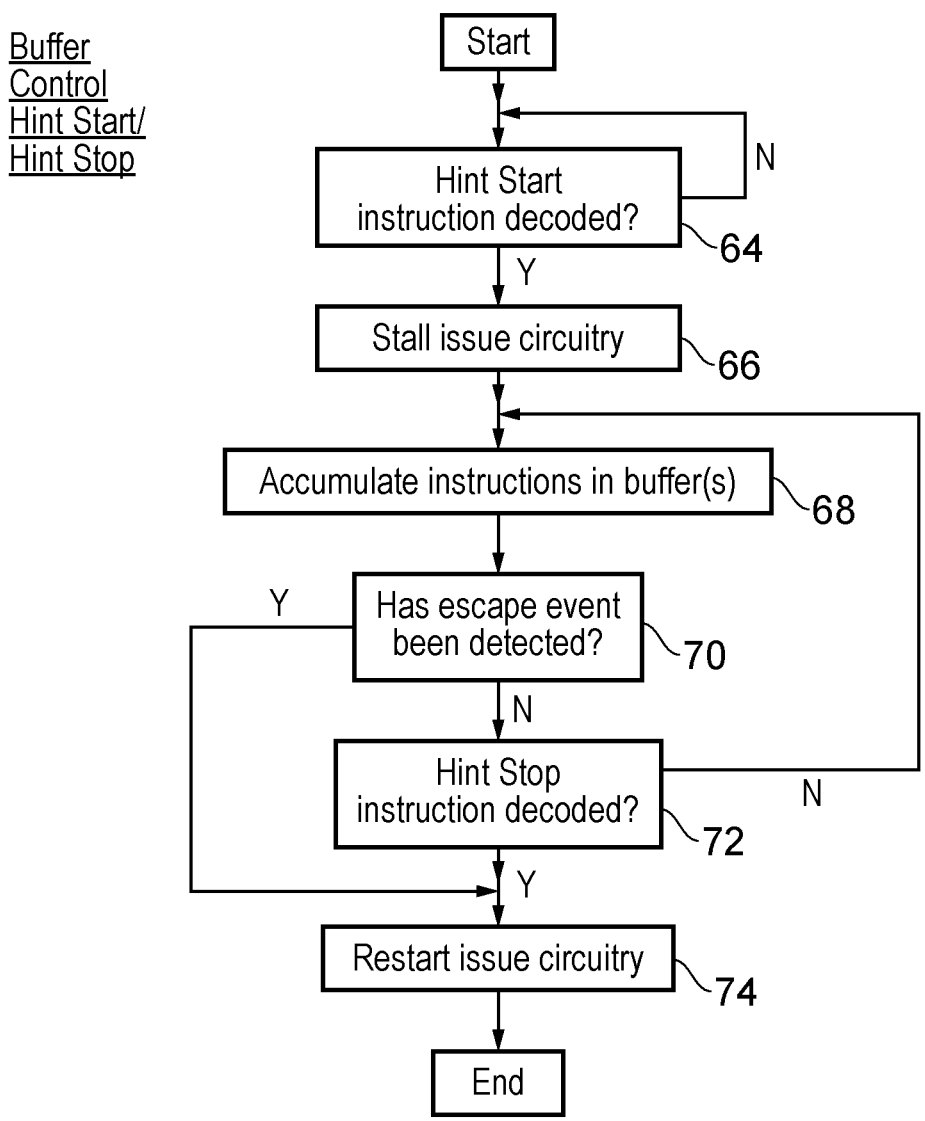
FIG. 6 is a flow diagram schematically illustrating buffer control using a hint start instruction and a hint stop instruction.

FIG. 6 is a flow diagram schematically illustrating buffer control using separate hint start and hint stop instructions to delimit the burst of instructions to be accumulated. Processing waits at step 64 for a hint start instruction to be decoded. When such a hint start instruction is decoded, then the buffer control circuitry 34 serves to stall the issue circuitry 16 at step 66. Step 68 accumulates instructions into the buffers 30, 32 as the fetch circuitry is not stalled and continues its fetching operations. Step 70 determines whether the escape circuitry 40 has detected an escape event. If no escape event has been detected, then processing proceeds to step 72 where a determination is made as to whether or not a hint stop instruction has been decoded. If no hint stop instruction has been decoded, then processing returns to step 68. If a hint stop instruction has been decoded, then the required burst of instructions has been accumulated within the buffers 30, 32 and processing proceeds to step 74 where the issue circuitry 16 is restarted. If an escape event is detected at step 70, then step 72 is bypassed and processing proceeds to step 74 where the issue circuitry is restarted.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
a processing pipeline having fetch circuitry to fetch instructions to be executed from a memory;
one or more buffers to store instructions fetched from said memory by said fetch circuitry;
buffer control circuitry responsive to a programmable trigger:
to stall a stallable portion of said processing pipeline downstream of said one or more buffers;

to accumulate within said one or more buffers a burst of instructions comprising a programmably specifiable number of instructions starting from a predetermined starting instruction; and when said programmably specifiable number of instructions have been accumulated within said one or more buffers, to restart said stallable portion of said processing pipeline, wherein the buffer control circuitry is responsive to a first programmable trigger indicative of a first number of instructions to accumulate within said one or more buffers the first number of instructions; and wherein the buffer control circuitry is responsive to a second programmable trigger indicative of a second number of instructions different from the first number of instructions to accumulate within said one or more buffers the second number of instructions;

wherein the programmable trigger comprises at least one of:

a burst length parameter programmably specifying said programmably specifiable number of instructions; and a hint instruction marking an end of said burst of instructions, wherein said buffer control circuitry comprises escape circuitry to detect an escape event, and, when said escape event is detected, to stop said accumulating to said one or more buffers and to restart said stallable portion.

2. Apparatus as claimed in claim 1, wherein said processing pipeline comprises execute circuitry to execute said instructions; and issue circuitry to issue instructions fetched from said memory by said fetch circuitry to said execute circuitry for execution.

3. Apparatus as claimed in claim 2, wherein said stallable portion comprises said issue circuitry.

4. Apparatus as claimed in claim 1, wherein said programmable trigger further comprises:

a start point parameter programmably specifying said predetermined starting instruction.

5. Apparatus as claimed in claim 1, wherein said programmably specifiable number comprises a fixed burst length.

6. Apparatus as claimed in claim 1, wherein said programmable trigger comprises execution of a hint instruction marking a start of said burst of instructions.

7. Apparatus as claimed in claim 1, wherein said programmable trigger comprises setting a programmable flag within a configuration register to prime said buffer control circuitry to perform said actions of stalling, accumulating and restarting in synchronism with a synchronising instruction within a stream of instruction to be executed.

8. Apparatus as claimed in claim 1, wherein said processing pipeline comprises decoder circuitry to decode instructions fetched by said fetch circuitry.

9. Apparatus as claimed in claim 1, wherein said one or more buffers stores said instructions fetched by said fetch circuitry before said instructions are supplied to said processing pipeline downstream of said fetch circuitry.

10. Apparatus as claimed in claim 8, wherein said one or more buffers stores said instructions decoded by said decoder circuitry before said instructions are supplied to said processing pipeline downstream of said decoder circuitry.

11. Apparatus as claimed in claim 1, wherein said one or more buffers also temporarily stores instructions during operation of said processing pipeline independent of said programmable trigger.

12. Apparatus as claimed in claim 1, wherein said one or more buffers supplies instructions within said burst of instructions to said processing pipeline with deterministic timings independent of latencies of fetching of said instructions within said burst of instructions from said memory to said one or more buffers by said fetch circuitry.

13. Apparatus as claimed in claim 1, wherein said burst of instructions comprises built-in-self-test instructions for testing for faults within said apparatus.

14. Apparatus as claimed in claim 2, wherein said execute circuitry atomically executes said burst of instructions.

15. Apparatus as claimed in claim 1, comprising store forwarding circuitry to buffer given write data of a pending data write to a given memory address before said given write data is written to said memory, and to service with said given write data stored within said store forwarding circuitry a subsequent data read of said given address while said data write is still pending.

16. Apparatus as claimed in claim 1, wherein said escape event comprises at least one of:

a time taken for said programmably specifiable number of instructions to be fetched from said memory exceeds a threshold time; and one or more monitored events have occurred.

17. Apparatus for processing data comprising:

a processing pipeline having fetch means for fetching instructions to be executed from a memory;

a one or more buffer means for storing instructions fetched from said memory by said fetch means;

buffer control means responsive to a programmable trigger:

for stalling a stallable portion of said processing pipeline downstream of said one or more buffer means;

accumulating within said one or more buffer means a burst of instructions comprising a programmably specifiable number of instructions starting from a predetermined starting instruction; and when said programmably specifiable number of instructions have been accumulated within said one or more buffer means, for restarting said stallable portion of said processing pipeline, wherein the buffer control circuitry is responsive to a first programmable trigger indicative of a first number of instructions to accumulate within said one or more buffers the first number of instructions; and wherein the buffer control circuitry is responsive to a second programmable trigger indicative of a second number of instructions different from the first number of instructions to accumulate within said one or more buffers the second number of instructions;

wherein the programmable trigger comprises at least one of:

a burst length parameter programmably specifying said programmably specifiable number of instructions; and a hint instruction marking an end of said burst of instructions, wherein said buffer control means comprises an escape means to detect an escape event, and, when said escape event is detected, to stop said accumulating to said one or more buffers and to restart said stallable portion.

18. A method of processing data comprising:

fetching instructions to be executed from a memory; and in response to a programmable trigger:
- stalling a stallable portion of a processing pipeline downstream of one or more buffers;
- accumulating within said one or more buffers a burst of instructions comprising a programmably specifiable number of instructions starting from a predetermined starting instruction; and
- when said programmably specifiable number of instructions have been accumulated within said one or more buffers, restarting said stallable portion of said processing pipeline;
- wherein when the programmable trigger is a first programmable trigger indicative of a first number of instructions, the accumulating comprises accumulating within said one or more buffers the first number of instructions; and
- wherein when the programmable trigger is a second programmable trigger indicative of a second number of instructions, the accumulating comprises accumulating within said one or more buffers the second number of instructions;

wherein the programmable trigger comprises at least one of:
- a burst length parameter programmably specifying said programmably specifiable number of instructions; and
- a hint instruction marking an end of said burst of instructions, wherein the method further comprises detecting an escape event, and, when said escape event is detected, stopping said accumulating to said one or more buffers and restarting said stallable portion.

* * * * *